(12) United States Patent
Edry et al.

(10) Patent No.: US 10,469,975 B2
(45) Date of Patent: Nov. 5, 2019

(54) PERSONALIZATION OF SPATIAL AUDIO FOR STREAMING PLATFORMS

(71) Applicant: MICROSOFT TECHNOLOGY LICENSING, LLC, Redmond, WA (US)

(72) Inventors: Philip Andrew Edry, Seattle, WA (US); Todd Ryun Manion, Seattle, WA (US); Robert Norman Heitkamp, Sammamish, WA (US); Steven Marcel Elza Wilssens, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 15/595,730

(22) Filed: May 15, 2017

(65) Prior Publication Data

US 2018/0332423 A1    Nov. 15, 2018

(51) Int. Cl.
*H04S 7/00* (2006.01)
*G06F 3/01* (2006.01)
*H04R 3/12* (2006.01)
*H04R 5/04* (2006.01)

(52) U.S. Cl.
CPC ............. *H04S 7/303* (2013.01); *G06F 3/012* (2013.01); *H04R 3/12* (2013.01); *H04R 5/04* (2013.01); *H04R 2420/07* (2013.01); *H04S 7/304* (2013.01); *H04S 2420/01* (2013.01); *H04S 2420/11* (2013.01)

(58) Field of Classification Search
CPC ........ G06F 3/011; G06F 3/162; G10L 19/008; G10L 19/167; G10L 19/20; H04M 3/568; H04S 2400/11; H04S 2420/01; H04S 7/303; H04S 2420/11; H04S 3/008; H04S 7/308; H04S 2400/01; H04S 7/30; H04S 7/304; H04S 7/302; H04S 7/306
USPC ......... 348/39; 379/202.01; 381/22; 715/716, 715/730; 725/139
See application file for complete search history.

(56) References Cited

U.S. PATENT DOCUMENTS

| | | | |
|---|---|---|---|
| 8,661,496 B2* | 2/2014 | Perlman | A63F 13/12 463/1 |
| 2016/0134988 A1* | 5/2016 | Gorzel | G10L 19/00 381/22 |
| 2017/0269713 A1* | 9/2017 | Marks | A63F 13/335 |

* cited by examiner

*Primary Examiner* — Duc Nguyen
*Assistant Examiner* — Alexander L Eljaiek
(74) *Attorney, Agent, or Firm* — Newport IP, LLC; Han Gim (57) ABSTRACT

The present disclosure provides a number of techniques for personalization of spatial audio across a plurality of systems. A participant media system participating in a session may generate two outputs: personalized audio data and depersonalized audio data. When a spectator attempts to spectate the session, a media sharing platform may distribute shared depersonalized audio data to the spectator system. Based on this shared depersonalized audio data, the spectator media system can personalized the audio data to cause an endpoint device to render spectator personalized audio based on HRTF data for the spectator. Accordingly, the spectator personalized audio is personalized and allows a rich, immersive spectating experience that overcome drawbacks associated with receiving personalized audio from participant systems.

28 Claims, 6 Drawing Sheets

PERSONALIZATION OF SPATIAL AUDIO FOR STREAMING PLATFORMS

BACKGROUND

Some streaming video platforms, such as Twitch, provide services that focus on video gaming, including playthroughs of video games, broadcasts of eSports competitions, and other events. Such platforms also share creative content, and more recently, music broadcasts. In some existing systems, there are two types of users: participants and spectators. Participants of the system can control aspects of a session defining an event. For example, data defining a session can enable participants to control avatars in a virtual reality environment and enable the participation in tournaments, games, or other forms of competition. The participants can interact with objects in the virtual reality environment, including objects controlled by other participants, etc. Content of such events can either be streamed to spectators in real time or via video on demand.

Although existing systems can enable a large number of spectators to watch the activity of participants of a session, some existing systems have a number of drawbacks. For instance, some existing systems provide a poor quality audio output to the spectators. In some cases, participants of a session may have a high quality, three-dimensional audio output, while the spectators may only receive a diluted version, or an identical copy, of the participant's audio stream. Such systems can cause spectators to be unengaged, as the spectators have a limited amount of control of what they can see and hear.

Furthermore, in some cases when personalized audio data is used for participants of the session, such as head-related transfer function (HRTF) data, some of the audio may be replicated to multiple players and/or spectators. Thus, spectators may unwillingly receive personalized audio that is tailored for a participant. For example, some spectators may receive audio with some characteristics of audio components (e.g., such as bass, frequency ranges, etc.) tailored for a participant, which may cause spectators to miss out on important aspects of the audio (e.g., increased or decreased bass components) that may be important for providing immersive experience.

It is with respect to these and other considerations that the disclosure made herein is presented.

SUMMARY

The techniques disclosed herein provide a high fidelity, rich, and engaging experience for spectators of streaming video services. In some configurations, a system can have two categories of users: participants and spectators. In general, participants can control a number of aspects of a session. For example, a session may include a game session, a virtual reality session, and the virtual reality environment can include a two-dimensional environment or a three-dimensional environment. A participant of the session can control the position of an object, such as an avatar, within a virtual reality environment. The participant can also control the orientation, e.g., the direction of a viewing area, from the position of the object. Based on the position and orientation of the object, a personalized participant audio output can be generated for the participant using any suitable technology. For instance, the system can generate an Ambisonics-based audio output, a 3D audio output, a channel-based output, or any other type of suitable output.

Spectators, on the other hand, do not have control over aspects of a session. However, spectators can still receive audio information including shared depersonalized audio data based on one or more participants' audio as described above. In these scenarios, a spectator media system may receive, process, and personalize the shared depersonalized audio data using a spectator's head-related transfer function (HRTF) data to create a spectator personalized audio output for an endpoint device.

In one illustrative example, a participant media system can receive media data from a participant media platform. The media data can comprise at least one of 3D audio data, Ambisonics data, and channel-based audio data. Other forms of media data can also be received in some implementations.

The participant media system can also generate depersonalized audio data based on the media data. The depersonalized audio data can comprise at least one audio component associated with the participant media platform. For example, at least one audio component can include a sequence of audio sounds, frequencies, or other audio components. Thereafter, the participant media system can communicate the depersonalized audio data to cause sharing of the depersonalized audio data, and generate participant personalized audio data based on the media data. The participant personalized audio data comprises the at least one audio component personalized based on HRTF data of a participant.

Accordingly, the participant media system can generate at least two outputs: a participant personalized audio data and a depersonalized audio data. The at least two outputs can be used to ensure participants and spectators receive rich and immersive audio associated with a session.

According to another aspect, a media sharing platform or system can receive depersonalized audio data from a plurality of participant media systems. For example, the depersonalized audio data can include at least one audio component that is not personalized or is otherwise absent personalization. Thus, the depersonalized audio data can be readily personalized for spectators and other users.

The media sharing system can sum the depersonalized audio data from multiple participant systems to create shared depersonalized audio data for spectators. The shared depersonalized audio data can define one or more audio components lacking personalized configurations. Thus, the shared depersonalized audio data is available for spectators to personalize the received data, e.g., personalize the received audio according to a particular user's biometrics, auditory geometry, and other head-related aspects.

The media sharing system can transmit the shared depersonalized audio data to cause at least one spectator media system to generate a personalized audio output based on each recipient's HRTF data. In this scenario, the HRTF data may be associated with the spectator media system, and can be different from any HRTF data associated with the participants.

Accordingly, the media sharing system can receive and process depersonalized audio data from a plurality of sources. This depersonalized audio data can be summed to create shared depersonalized audio data comprising the depersonalized audio data from the plurality of sources. Thereafter, the media sharing system can distribute the shared depersonalized audio data to a plurality of spectator media systems for subsequent personalization. In this manner, the media sharing platform can overcome many drawbacks including redundant or diluted audio content being transmitted to spectators.

According to another aspect, an operating environment may include participant media systems, a media sharing platform, and spectator media systems. A participant media system can receive media data from a participant media platform. The media data can comprise at least one of 3D audio data, Ambisonics data, and channel-based audio data. The participant media system can generate depersonalized audio data based on the media data. In general, the depersonalized audio data can comprise at least one audio component associated with the participant media platform.

Subsequently, or at substantially the same time, the participant media system can communicate the depersonalized audio data to the media sharing platform. The media sharing platform can be configured to process the depersonalized audio data to generate shared depersonalized audio data. Thereafter, the media sharing platform can transmit the shared depersonalized audio data to an endpoint device.

In one implementation, the shared depersonalized audio data causes the endpoint device to render output audio based on a head-related transfer function (HRTF) data of a spectator, and the output audio comprises personalized audio data. In another implementation, the shared depersonalized audio data is processed by a HRTF module to incorporate HRTF data and create the output audio. Other implementations are also possible.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques disclosed herein provide a high fidelity, rich, and engaging experience for spectators of streaming video services. In some configurations, a system can have two categories of users: participants and spectators. In general, participants can control a number of aspects of a session. For example, a session may include a game session, a virtual reality session, and a virtual reality environment can include a two-dimensional environment or a three-dimensional environment. A participant of the session can control the position of an object, such as an avatar, within a virtual reality environment. The participant can also control the orientation, e.g., the direction of a viewing area, from the position of the object. Based on the position and orientation of the object, a personalized participant audio output can be generated for the participant using any suitable technology. For instance, the system can generate an Ambisonics-based audio output, a 3D audio output, a channel-based output, or any other type of suitable output.

Spectators, on the other hand, do not have control over aspects of a session. However, spectators may still receive audio information including shared depersonalized audio data based on one or more participants' audio as described above. In these scenarios, a spectator media system may receive, process, and personalize shared depersonalized audio data to create a spectator personalized audio output for an endpoint device.

In some configurations, a participant media system can receive media data from a participant media platform. The media data can comprise at least one of 3D audio data, Ambisonics data, and channel-based audio data. Other forms of media data can also be received in some implementations.

The participant media system can also generate depersonalized audio data based on the media data. The depersonalized audio data can comprise at least one audio component associated with the participant media platform. For example, the at least one audio component can include a sequence of audio sounds, frequencies, or other audio components. Thereafter, the participant media system can communicate the depersonalized audio data to cause sharing of the depersonalized audio data, and generate participant personalized audio data based on the media data. The participant personalized audio data comprises the at least one audio component personalized based on a head-related transfer function (HRTF) data of a participant.

Accordingly, the participant media system can generate at least two outputs: a participant personalized audio data and a depersonalized audio data. The two outputs can be used to ensure participants and spectators receive rich and immersive audio associated with a session.

According to another aspect, a media sharing platform or system can receive depersonalized audio data from a plurality of participant media systems. For example, the depersonalized audio data can include at least one audio component that is not personalized or is otherwise absent personalization. Thus, the depersonalized audio data can be readily personalized for spectators.

The media sharing system can sum the depersonalized audio data to create shared depersonalized audio data. The shared depersonalized audio data can define one or more audio components lacking personalized configurations. For example, personalized configurations may include HRTF configurations based on a particular user's biometrics, auditory geometry, and other head-related aspects. Thus, the shared depersonalized audio data may be somewhat more compact as compared to personalized audio data, and can be readily personalized for a plurality of different users.

The media sharing system can transmit the shared depersonalized audio data to cause at least one spectator media system to generate a spectator personalized audio output based on HRTF data. In this scenario, the HRTF data may be associated with the spectator media system, and can be different from HRTF data associated with participants.

Accordingly, the media sharing system can receive and process depersonalized audio data from a plurality of sources. This depersonalized audio data can be summed to create shared depersonalized audio data comprising the depersonalized audio data from the plurality of sources. Thereafter, the media sharing system can distribute the shared depersonalized audio data to a plurality of spectator media systems for subsequent personalization. In this manner, the media sharing platform can overcome many drawbacks including redundant or diluted audio content being transmitted to spectators.

According to another aspect, an operating environment may include participant media systems, a media sharing platform, and spectator media systems. A participant media system can receive media data from a participant media platform. The media data can comprise at least one of 3D audio data, Ambisonics data, and channel-based audio data. The participant media system can generate depersonalized audio data based on the media data. In general, the depersonalized audio data can comprise at least one audio component associated with the participant media platform.

Subsequently, or at substantially the same time, the participant media system can communicate the depersonalized audio data to the media sharing platform. The media sharing platform can be configured to process the depersonalized audio data to generate shared depersonalized audio data. Thereafter, the media sharing platform can transmit the shared depersonalized audio data to an endpoint device.

In one implementation, the shared depersonalized audio data causes the endpoint device to render output audio based on a head-related transfer function (HRTF) data of a spectator, and the output audio comprises personalized audio data. In another implementation, the shared depersonalized audio data is processed by a HRTF module to incorporate HRTF data and create the output audio. Other implementations are also possible.

Figure 1:
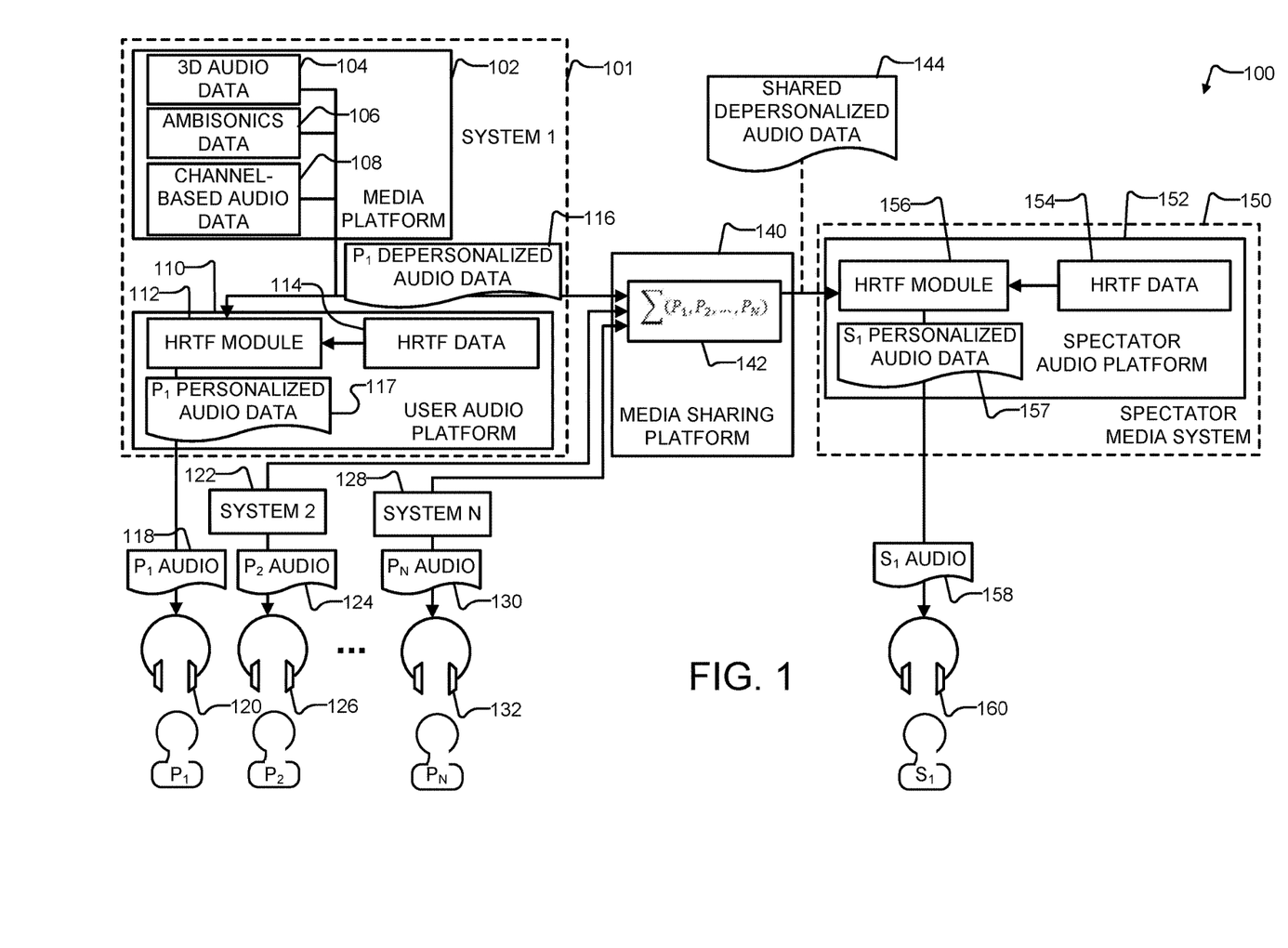
FIG. 1 is a diagram illustrating an example operating environment in which one or more systems can operate to facilitate personalization of spatial audio from one or more participants and one or more spectators.

Turning now to the drawings, FIG. 1 is a diagram illustrating an example operating environment 100 in which one or more systems 101, 122, 128, 140, 150 can operate to facilitate personalization of spatial audio from one or more participants $P_1$ through $P_N$ and one or more spectators $S_1$, where N is an integer greater than or equal to 1. Generally, the system 101 may be a participant media system such as a computing device, gaming console, gaming system, VR system, or other suitable system configured to provide a rich and immersive media experience for the participant $P_1$.

The system 101 can include a media platform 102 and a user audio platform 110. The media platform 102 is configured to receive or generate different media data. For example, the media platform can receive or generate 3D audio data 104, Ambisonics data 106, and channel-based audio data 108.

Although other technologies can be used, configurations utilizing Ambisonics technology may provide additional performance benefits given that output audio based on the Ambisonics technology can be rotated after the fact, e.g., after the output audio has been generated.

Generally described, output audio, e.g., an audio output, based on the Ambisonics technology involves a full-sphere surround sound technique. In addition to the horizontal plane, the output audio covers sound sources above and below the listener. Thus, in addition to defining a number of other properties for each stream, each stream is associated with a location defined by a three-dimensional coordinate system.

An audio output based on the Ambisonics technology can also contain a speaker-independent representation of a sound field called the B-format, which is configured to be decoded by a listener's (spectator or participant) output device or system. This configuration allows the system 101 to record data in terms of source directions rather than loudspeaker positions, and offers the listener a considerable degree of flexibility as to the layout and number of speakers used for playback.

However, other forms of 3D audio data including the 3D audio data 104 may also be implemented. In these configurations, any suitable form of 3D audio data 104 may be used. Similarly, channel-based audio data 108 may also be utilized. Channel-based audio data 108 can include Dolby and/or Dolby Atmos in some configurations. In these scenarios, the system 101 can implement a variety of media data formats thereby enhancing experiences across many different sessions such as video games, VR experiences, media experiences, and the like.

The media platform 102 can use the received media data to generate participant depersonalized audio data 116. For example, participant depersonalized audio data 116 may be associated with participant $P_1$ in this example. The participant depersonalized audio data 116 may include one or more audio components such as bass, treble, frequency ranges, frequency attributes, and other components. Generally, these components are associated with the 3D audio data 104, Ambisonics data 106, and/or the channel-based audio data 108. The participant depersonalized audio data 116 may lack personalization for the participant $P_1$, and therefore may be readily personalized at other systems of the operating environment 100, as described herein.

The user audio platform 110 may receive the participant depersonalized audio data 116 and process the participant depersonalized audio data 116 at a HRTF module 112 to create participant personalized audio data 117. For example, the HRTF module can be configured as an audio processing module operative to receive HRTF data 114 associated with the participant $P_1$.

The HRTF data 114 may include biometric data related to any user, e.g., the participant $P_1$. For example, a head-related transfer function (HRTF) is a transfer function that characterizes how an ear receives a sound from a point in space. As sound strikes the listener, the size and shape of the head, ears, ear canal, density of the head, size and shape of nasal and oral cavities, all transform the sound and affect how it is perceived, boosting some frequencies and attenuating others. The HRTF data 114 may describe this function for the participant $P_1$ and allow the HRTF module to appropriately personalize audio for the participant $P_1$.

The user audio platform 110 may output a participant personalized output audio 118 to the participant $P_1$, based on the participant personalized audio data 117. For example, the user audio platform 110 can direct an endpoint device 120 to render the participant personalized output audio 118 for the participant $P_1$.

Thus, as described above, a participant media system 101 can receive media data, process media data to create a first output of depersonalized audio data, and process the media data or depersonalized audio data to create personalized audio data based on HRTF data. As further illustrated in FIG. 1, additional participant media systems 122 and 128 may operate and function significantly similar to the participant media system 101. For example, the system 122 can create participant personalized output audio 124 rendered at endpoint device 126 for participant $P_2$. Similarly, the system 128 can create participant personalized output audio 130 rendered at endpoint device 132 for participant $P_N$. Additionally, each of the system 122 and system 128 can also provide participant depersonalized audio data, similar to participant depersonalized audio data 116, to the media sharing platform 140.

In general, the media sharing platform 140 is a platform, server, system, or computing device configured to distribute audio and media data to one or more spectator media systems. In some configurations, the media sharing platform 140 can be arranged similar to TWITCH or BEAM. For example, the media sharing platform 140 can be arranged to stream or otherwise distribute audio information to several computing devices.

The media sharing platform 140 can be arranged to receive the participant depersonalized audio data 116 from the participant media system 101. Thereafter, the media sharing platform 140 can process the participant depersonalized audio data 116 at a summation module 142. The summation module 142 can be a logical processor such as a computer processor or other suitable component configured to accumulate participant depersonalized audio data from the systems 101, 122, and 128. The summation module 142 can sum the received participant depersonalized audio data to create shared depersonalized audio data 144 for distribution and/or streaming.

According to one implementation, the shared depersonalized audio data 144 is a cumulative set of audio data representing one or more audio components from the participant depersonalized audio data. In some implementations, the shared depersonalized audio data 144 can include audio data from one participant media system 101. In other implementations, the shared depersonalized audio data 144 can include audio data from multiple systems 1 through N, where N is an integer greater than or equal to 1. Generally, the media sharing platform 140 can "share" or stream the shared depersonalized audio data to one or more spectator media systems.

As shown in FIG. 1, the spectator media system 150 can receive the shared depersonalized audio data 144 from the media sharing platform 140. The spectator media system 150 can be arranged similarly to the participant media system 101 in some implementations. In other implementations, the spectator media system 150 may be different or substantially different from the participant media system 101.

The spectator media system 150 can include a spectator audio platform 152 arranged to process the received shared depersonalized audio data 144. For example, the spectator audio platform 152 can include a HRTF module 156 configured to create spectator personalized audio data 157 based on the shared depersonalized audio data 144 and HRTF data 154. It is noted that the HRTF module 156 and the HRTF data 154 may be similar to the HRTF module 112 and the HRTF data 114. Accordingly, exhaustive description of the operation of these components is omitted for the sake of brevity.

The spectator audio platform 152 can create the spectator personalized audio data 157 based on the HRTF data 154. Furthermore, the spectator audio platform 152 can direct an endpoint device 160 to render a spectator personalized output audio 158 based on the spectator personalized audio data 157. Thus, while the spectator $S_1$ may have differing or substantially different biometrics and head geometry, and therefore HRTF data as compared to any of the described participants, the spectator personalized output audio 158 may still be personalized such that the spectator $S_1$ experiences a rich audio experience based on several different participant audio data.

Figure 2:
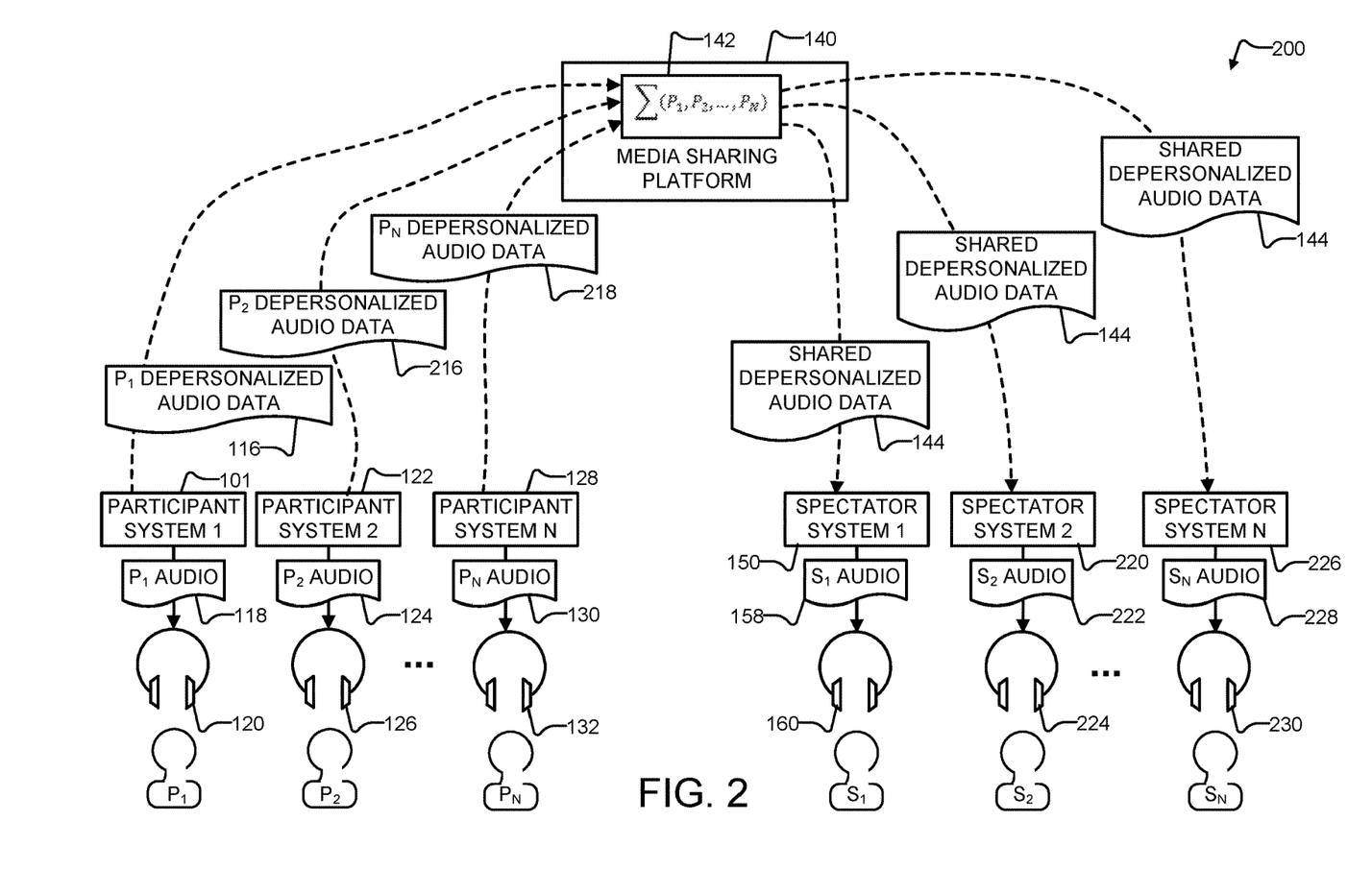
FIG. 2 is a diagram illustrating an example operating environment in which one or more systems can operate to facilitate personalization of spatial audio from a plurality of participants and a plurality of spectators.

Although described above as particularly relating to one or more spectators, it should be understood that the operating environment 100 may support a plurality of participants and a plurality of spectators. FIG. 2 is a diagram illustrating an example operating environment 200 in which one or more systems can operate to facilitate personalization of spatial audio from a plurality of participants and a plurality of spectators.

As shown in FIG. 2, the example operating environment 200 is substantially similar to the environment 100. The scenario illustrated in FIG. 2 shows a plurality of participants $P_1$ through $P_N$ providing participant depersonalized audio data 116, 216, and 218 to the media sharing platform 140. The media sharing platform 140 also processes and distributes the shared depersonalized audio data 144 to a plurality of spectators $S_1$ through $S_N$. For example, shared depersonalized audio data 144 is distributed to spectator media system 150, spectator media system 220, and spectator media system 226. Thereafter, personalized spectator output audio 158, 222, and 228 is rendered at spectator endpoint devices 160, 224, and 230, respectively.

Thus, as described above, the technologies disclosed herein are operative to distribute shared depersonalized audio data 144 to one or more spectators. The distributed shared depersonalized audio data 144 can then be personalized for each independent spectator $S_1$ through $S_N$ based on HRTF data. Thus, the technologies disclosed herein overcome many drawbacks such that rich immersive audio is experienced regardless of an endpoint device or participation in a session.

Figure 3:
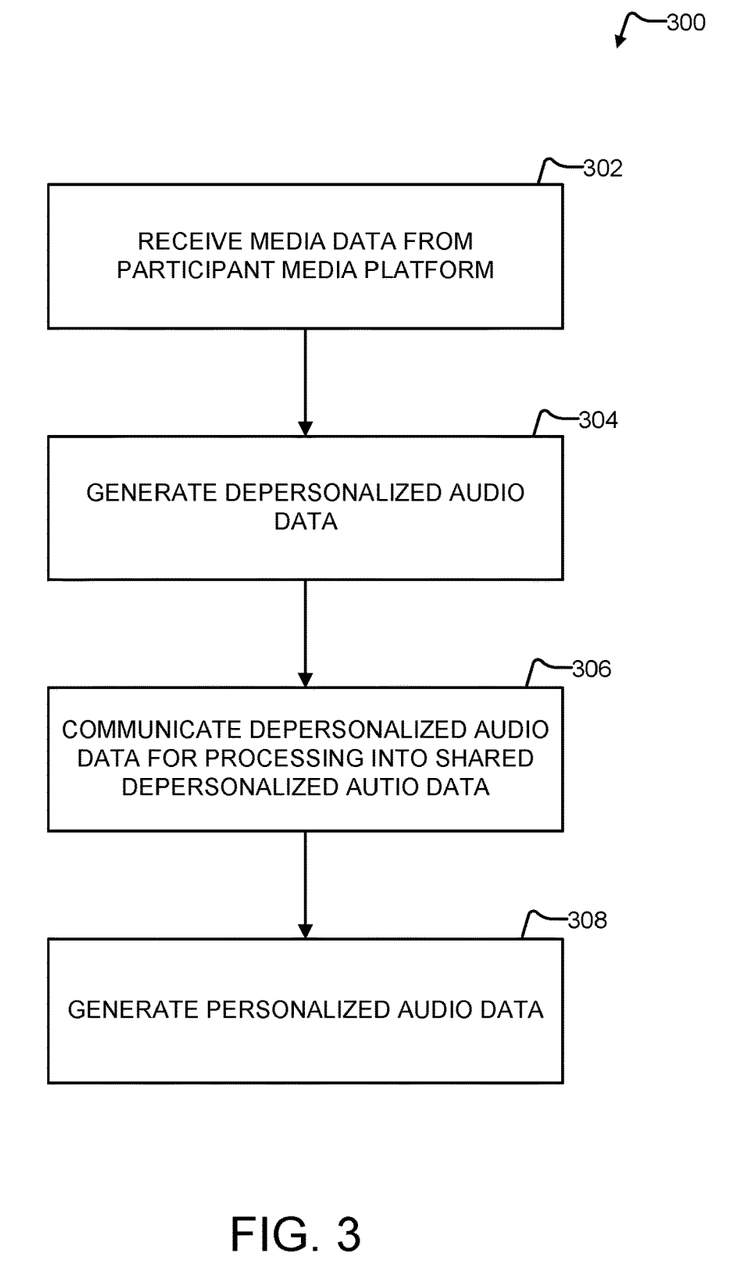
FIG. 3 is a flow diagram of a method of providing personalized spatial audio to one or more spectators, according to the techniques and technologies disclosed herein.
Figure 4:
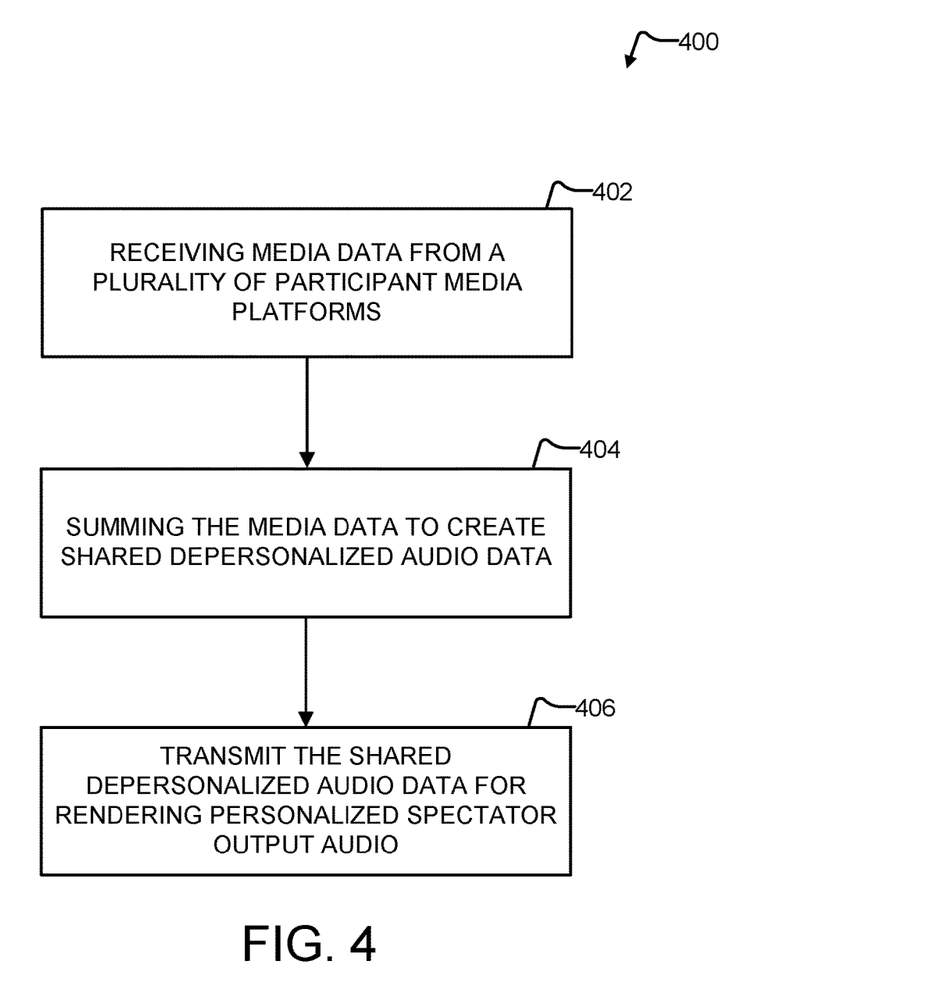
FIG. 4 is a flow diagram of a method of providing personalized spatial audio utilizing a media sharing platform, according to the techniques and technologies disclosed herein.
Figure 5:
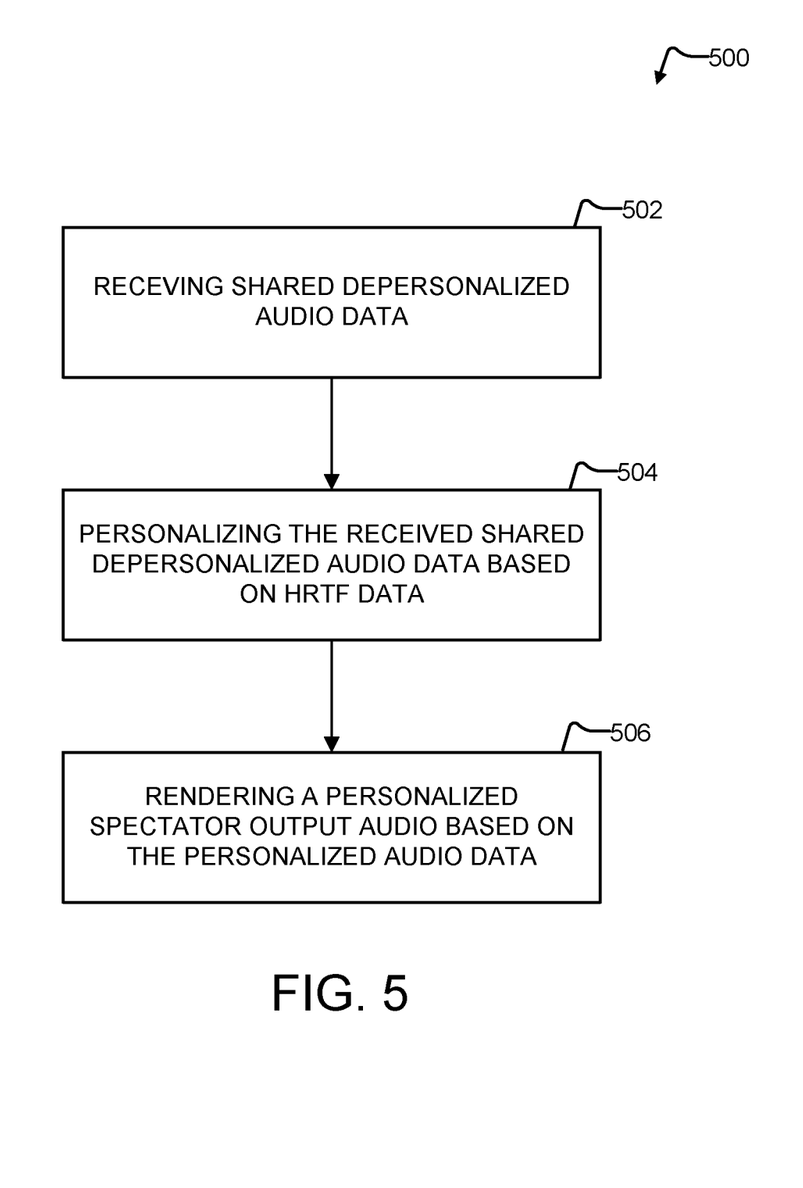
FIG. 5 is a flow diagram of a method of providing personalized spatial audio at spectator media systems, according to the techniques and technologies disclosed herein.

Hereinafter, a more detailed discussion of the operation of the systems and components described above is provided with reference to several flow diagrams. As illustrated in FIG. 3, FIG. 4, and FIG. 5, aspects of methods 300, 400, and 500 for providing personalized spatial audio are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the methods 300, 400, and 500 are described herein as being implemented, at least in part, by system components, which can comprise an application, component and/or a circuit. In some configurations, the system components include a dynamically linked library (DLL), a statically linked library, functionality produced by an application programming interface (API), a compiled program, an interpreted program, a script or any other executable set of instructions. Data, such as the audio data, 360 canvas and other data, can be stored in a data structure in one or more memory components. Data can be retrieved from the data structure by addressing links or references to the data structure.

Although the following illustration refers to the components of FIG. 1 and FIG. 2, it can be appreciated that the operations of the methods 300, 400, and 500 may be also implemented in many other ways. For example, the methods 300, 400, and 500 may be implemented, at least in part, by a processor of another remote computer or a local circuit. In addition, one or more of the operations of the methods 300, 400, and 500 may alternatively or additionally be implemented, at least in part, by a chipset working alone or in conjunction with other software modules. Any service, circuit or application suitable for providing the techniques disclosed herein can be used in operations described herein.

FIG. 3 is a flow diagram of a method 300 of providing personalized spatial audio to one or more spectators, according to the techniques and technologies disclosed herein. As shown, the system 101 can receive media data from a participant media platform 102, at block 302. Generally, the media data comprises at least one of 3D audio data 104, Ambisonics data 106, and channel-based audio data 108.

Additionally, the received media data can comprise one or more audio components having configured audio levels corresponding to each audio component. For example, the configured audio levels may be depersonalized, default, or otherwise normalized values such that the media data can be processed to create personalized and depersonalized audio data.

The system 101 can also generate depersonalized audio data 116 based on the media data, at block 304. The depersonalized audio data 116 comprises at least one audio component associated with the participant media platform 102.

The system 101 can also communicate the depersonalized audio data 116 to cause sharing of the depersonalized audio data 116, at block 306, and generate participant personalized audio data 117 based on the media data, at block 308. The participant personalized audio data 117 comprises the at least one audio component personalized based on a head-related transfer function (HRTF) data 114 of a participant, for example, participant $P_1$. For example, the system 101 can increase or decrease the configured audio levels of each audio component based on the HRTF data of the participant. An audio component, for example, may include a portion of audio signal within a predetermined bandwidth range, e.g., a treble range, middle range, or low range.

In at least one implementation, the system 101 can also cause the shared depersonalized audio data 144 to be shared with an endpoint device 160. The shared depersonalized audio data 144 can therefore cause the endpoint device 160 to render output audio 158 based on a head-related transfer function (HRTF) data of a spectator. The output audio 158 can comprise personalized audio data 157.

In another implementation, the system 101 can also transmit the participant personalized audio data 117 to an endpoint device 120. The participant personalized audio data 117 can therefore cause the endpoint device 160 to render participant personalized output audio 118. The rendering can be facilitated by the HRTF module 112, and can comprise rendering the participant personalized output audio 118 based on the depersonalized audio data 116 and based on HRTF data 114 of a participant. It should be appreciated that other variations in rendering of output audio may also be applicable.

In addition, while spectator personalized audio and participant personalized audio has been described as being spatial audio, it should be understood that many variations are also applicable. For example, according to at least one implementation, the system 101 can render participant output audio 118 based on the depersonalized audio data 116 and based on HRTF data 114 of a participant $P_1$. In this example, the participant output audio 118 can be stereo audio while the spectator output audio 158 can be fully spatial audio. Similarly, the participant output audio 118 can be fully spatial audio while the spectator output audio 158 may be stereo audio. Other variations may also be applicable.

Accordingly, the system 101 can function to provide at least two outputs: a participant depersonalized audio data 116 and a participant personalized audio data 117. The at least two outputs in the above scenario have been specifically described as related to one participant. However, the system 101 can also function to receive additional media data related to a plurality of participants, $P_1$ through $P_N$. Using this media data, the system 101 can generate a plurality of depersonalized audio data based on the additional media data, and communicate the plurality of depersonalized audio data to the media sharing platform 140. In this particular scenario, the media sharing platform 140 is further configured to sum the plurality of depersonalized audio data to generate the shared depersonalized audio data 144.

As described above, a media sharing platform can process and distribute the participant depersonalized audio data 116. For example, FIG. 4 is a flow diagram of a method 400 of providing personalized spatial audio utilizing a media sharing platform, according to the techniques and technologies disclosed herein.

As shown in FIG. 4, the media sharing platform 140 can receive depersonalized audio data 116, 216, 218 from a plurality of participant media systems 101, 122, 128, at block 402. The depersonalized audio data can lack any personalized audio components as described in detail above. Furthermore, the depersonalized audio data can comprise at least one audio component associated with a participant media platform of the plurality of participant media systems.

The media sharing platform 140 can also sum the depersonalized audio data 116, 216, 218 to create shared depersonalized audio data 144, at block 404. The shared depersonalized audio data 144 also defines one or more audio components lacking personalized configurations. For example, the individual audio components may be set at a threshold or default level, and may be personalized by individual systems receiving the shared data.

The media sharing platform 140 can also transmit the shared depersonalized audio data 144, at block 406, to cause at least one spectator media system 150 to generate a personalized audio output 158 based on HRTF data 154.

The media sharing platform 140 can also transmit the shared depersonalized audio data 144 to more than one spectator media system as illustrated in FIG. 2. Therefore, the media sharing platform can transmit the shared depersonalized audio data for rendering a plurality of output audio for a plurality of endpoint devices. Generally, the plurality of output audio is based on HRTF data of a plurality of spectators.

Thus, as described above, the media sharing platform 140 can process and distribute depersonalized audio data to a plurality of spectator media systems. Upon receipt, the spectator media systems can personalize the audio data based on HRTF data, as described in detail below.

FIG. 5 is a flow diagram of a method 500 of providing personalized spatial audio at spectator media systems, according to the techniques and technologies disclosed herein. As shown, a spectator media system 150 can receive shared depersonalized audio data 144 from a media sharing platform 140, at block 502. For example, the spectator media system 150 may receive a stream or other transmission of the shared depersonalized audio data 144.

Thereafter, the spectator media system 150 can personalize the received shared depersonalized audio data 144, at block 504. For example, the HRTF module 156 may create spectator personalized audio data 157 based on HRTF data 154. The HRTF data 154 is associated with the spectator $S_1$.

Finally, the spectator media system 150 can render a personalized spectator output audio 158 using endpoint device 160, at block 506. The personalized spectator output audio 158 is based on the spectator personalized audio data 157.

Thus, as described above, spectator media systems can receive shared depersonalized audio data from the media sharing platform 140. The spectator media systems can process the shared depersonalized audio data to create a spectator personalized audio data for rendering at endpoint devices for each spectator, based on HRTF data.

Figure 6:
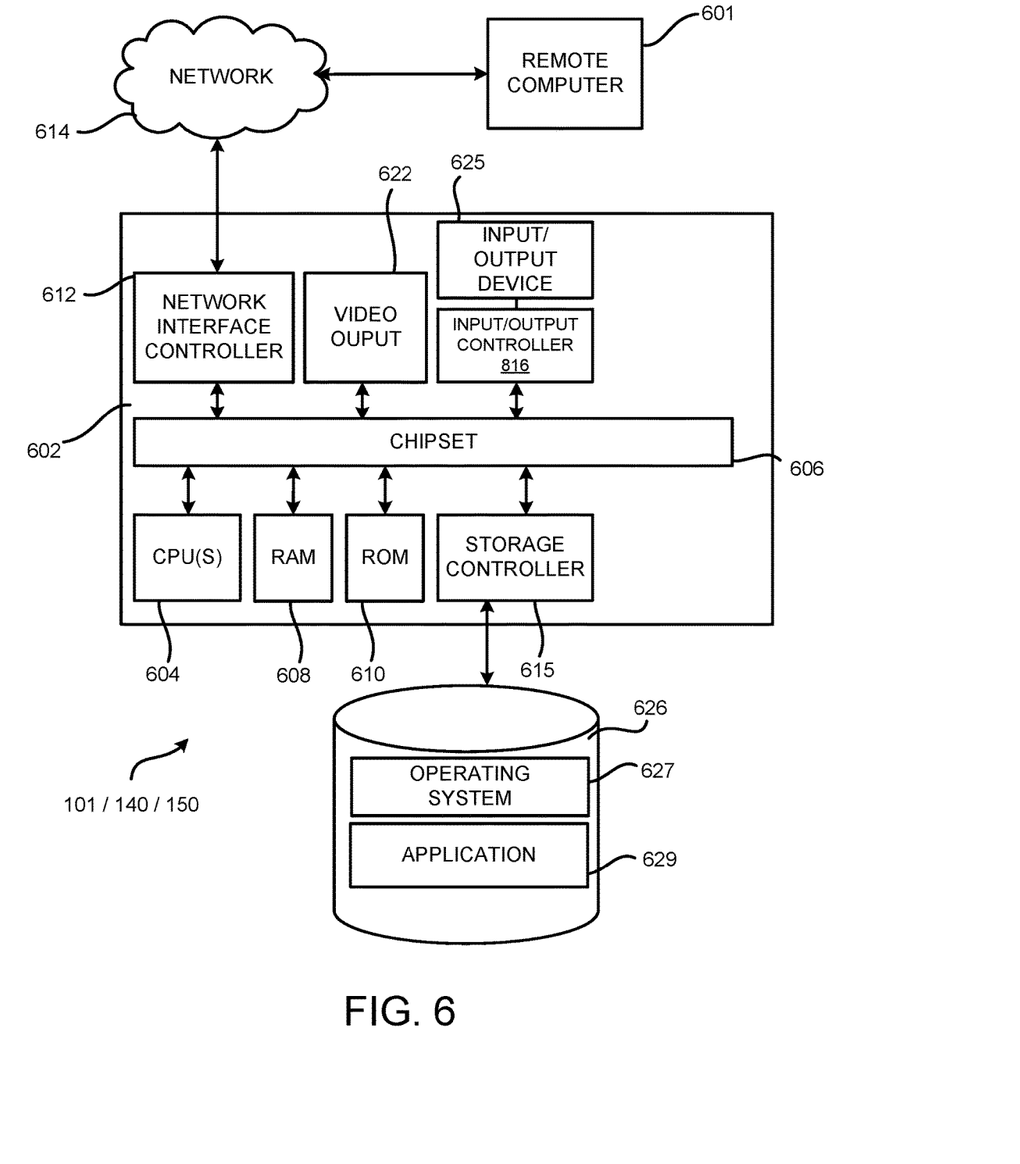
FIG. 6 is a computer architecture diagram illustrating a computing device architecture for a computing device capable of implementing aspects of the techniques and technologies presented herein.

FIG. 6 shows additional details of an example computer architecture for the components shown in FIG. 1 and FIG. 2 capable of executing the program components described above. The computer architecture shown in FIG. 6 illustrates aspects of a system, such as a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 6 may be utilized to execute any of the software components described above. Although some of the components described herein are specific to the computing devices 101, 122, 128, 140, 150, it can be appreciated that such components, and other components may be part of any suitable remote computer.

The computing device 101 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the computing device 101.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computing device 101. The chipset 606 may further provide an interface to a computer-readable storage medium such as a read-only memory ("ROM") 610 or non-volatile RAM ("NVRAM") for storing basic routines that help to startup the computing device 101 and to transfer information between the various components and devices. The ROM 610 or NVRAM may also store other software components necessary for the operation of the computing device 101 in accordance with the embodiments described herein.

The computing device 101 may operate in a networked environment using logical connections to remote computing devices and computer systems through a network 614, such as the local area network. The chipset 606 may include functionality for providing network connectivity through a network interface controller (MC) 612, such as a gigabit Ethernet adapter. The NIC 612 is capable of connecting the computing device 101 to other computing devices over the network. It should be appreciated that multiple NICs 612 may be present in the computing device 101, connecting the computer to other types of networks and remote computer systems. The network allows the computing device 101 to communicate with remote services and servers, such as the remote computer 601. As can be appreciated, the remote computer 601 may host a number of services such as the XBOX LIVE gaming service provided by MICROSOFT CORPORATION of Redmond, Wash. In addition, as described above, the remote computer 801 may mirror and reflect data stored on the computing device 101 and host services that may provide data or processing for the techniques described herein.

The computing device 101 may be connected to a mass storage device 626 that provides non-volatile storage for the computing device. The mass storage device 626 may store system programs, application programs, other program modules, and data, which have been described in greater detail herein. The mass storage device 626 may be connected to the computing device 101 through a storage controller 615 connected to the chipset 606. The mass storage device 626 may consist of one or more physical storage units. The storage controller 615 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 626, other storage media and the storage controller 615 may include MultiMediaCard (MMC) components, eMMC components, Secure Digital (SD) components, PCI Express components, or the like.

The computing device 101 may store data on the mass storage device 626 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 626 is characterized as primary or secondary storage, and the like.

For example, the computing device 101 may store information to the mass storage device 626 by issuing instructions through the storage controller 615 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 101 may further read information from the mass storage device 626 by detecting the physical states or characteristics of one or more particular locations within the physical storage units.

In addition to the mass storage device 626 described above, the computing device 101 may have access to other computer-readable media to store and retrieve information, such as program modules, data structures, or other data. Thus, the application 629, other data and other modules are depicted as data and software stored in the mass storage device 626, it should be appreciated that these components and/or other modules may be stored, at least in part, in other computer-readable storage media of the computing device 101. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computing device 101.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 101. For purposes of the claims, the phrase "computer storage medium," "computer-readable storage medium," and variations thereof, does not include waves or signals per se and/or communication media.

The mass storage device 626 may store an operating system 627 utilized to control the operation of the computing device 101. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 626 may store other system or application programs and data utilized by the computing devices 101, such as any of the other software components and data described above. The mass storage device 626 might also store other programs and data not specifically identified herein.

In one embodiment, the mass storage device 626 or other computer-readable storage media is encoded with computer-executable instructions which, when loaded into the computing device 101, transform the computer from a general-purpose computing system into a special-purpose computer capable of implementing the embodiments described herein. These computer-executable instructions transform the computing device 101 by specifying how the CPUs 604 transition between states, as described above. According to one embodiment, the computing device 101 has access to computer-readable storage media storing computer-executable instructions which, when executed by the computing device 101, perform the various routines described above with regard to FIG. 3, FIG. 4, FIG. 5, and the other FIGURES. The computing device 101 might also include computer-readable storage media for performing any of the other computer-implemented operations described herein.

The computing device 101 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controller 616 is in communication with an input/output device 625. The input/output controller 616 may provide output to a display, such as a computer monitor, a flat-panel display, a digital projector, a printer, a plotter, or other type of output device. The input/output controller 616 may provide input communication with other devices such as a microphone, a speaker, game controllers and/or audio devices.

For example, the input/output controller 616 can be an encoder and the output device 625 can include a full speaker system having a plurality of speakers. The encoder can use a spatialization technology, such as Dolby Atmos, HRTF or another Ambisonics-based technology, and the encoder can process audio output audio or output signals received from the application 629. The encoder can utilize a selected spatialization technology to generate a spatially encoded stream that appropriately renders to the output device 625.

The computing device 101 can process audio signals in a number of audio types, including but not limited to 2D bed audio, 3D bed audio, 3D object audio and audio data Ambisonics-based technology as described herein.

2D bed audio includes channel-based audio, e.g., stereo, Dolby 5.1, etc. 2D bed audio can be generated by software applications and other resources.

3D bed audio includes channel-based audio, where individual channels are associated with objects. For instance, a Dolby 5.1 signal includes multiple channels of audio and each channel can be associated with one or more positions. Metadata can define one or more positions associated with individual channels of a channel-based audio signal. 3D bed audio can be generated by software applications and other resources.

3D object audio can include any form of object-based audio. In general, object-based audio defines objects that are associated with an audio track. For instance, in a movie, a gunshot can be one object and a person's scream can be another object. Each object can also have an associated position. Metadata of the object-based audio enables applications to specify where each sound object originates and how it should move. 3D bed object audio can be generated by software applications and other resources.

Output audio data generated by an application can also define an Ambisonics representation. Some configurations can include generating an Ambisonics representation of a sound field from an audio source signal, such as streams of object-based audio of a video game. The Ambisonics representation can also comprise additional information describing the positions of sound sources, wherein the Ambisonics data can be include definitions of a Higher Order Ambisonics representation.

Higher Order Ambisonics (HOA) offers the advantage of capturing a complete sound field in the vicinity of a specific location in the three-dimensional space, which location is called a 'sweet spot'. Such HOA representation is independent of a specific loudspeaker set-up, in contrast to channel-based techniques like stereo or surround. But this flexibility is at the expense of a decoding process required for playback of the HOA representation on a particular loudspeaker set-up.

HOA is based on the description of the complex amplitudes of the air pressure for individual angular wave numbers k for positions x in the vicinity of a desired listener position, which without loss of generality may be assumed to be the origin of a spherical coordinate system, using a truncated Spherical Harmonics (SH) expansion. The spatial resolution of this representation improves with a growing maximum order N of the expansion.

In addition, or alternatively, a video output 622 may be in communication with the chipset 606 and operate independent of the input/output controllers 616. It will be appreciated that the computing device 101 may not include all of the components shown in FIG. 6, may include other components that are not explicitly shown in FIG. 6, or may utilize an architecture completely different than that shown in FIG. 6.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device, comprising:
    a processor;
    a memory having computer-executable instructions stored thereupon which, when executed by the processor, cause the computing device to:
    receive media data from a participant media platform, wherein the media data comprises at least one of 3D audio data, ambisonics data, and channel-based audio data, and wherein the media data is generated based at least in part on a position of objects within an interactive rendered environment controlled by a participant media system that is communicatively coupled to the participant media platform;
    generate personalized audio data based on the media data using a localized head-related transfer function (HRTF) of the computing device;
    generate depersonalized audio data based on the media data and communicate the depersonalized audio data to a shared media platform configured to:
        accumulate depersonalized audio data from a plurality of participant media systems;
        send the accumulated depersonalized audio data to a plurality of spectator media systems configured to generate spectator personalized audio output based on localized HRTFs at the spectator media systems, wherein the spectator media systems do not have control over the position of objects in the interactive rendered environment.

2. The computing device of claim 1, wherein the computer-executable instructions further cause the computing device to:
    cause transmission of the accumulated depersonalized audio data to an endpoint device, the accumulated depersonalized audio data causing the endpoint device to render output audio data.

3. The computing device of claim 1, wherein the received media data comprises one or more audio components having configured audio levels corresponding to each audio component.

4. The computing device of claim 3, wherein the computer-executable instructions further cause the computing device to
    increase or decrease the configured audio levels of each audio component based on the HRTF data of the participant.

5. A system, comprising:
    a processor;
    a memory having computer-executable instructions stored thereupon which, when executed by the processor cause the system to:
    receive depersonalized audio data from a plurality of participant media systems, wherein the depersonalized audio data is generated based at least in part on a position of objects within an interactive rendered environment controlled by the participant media systems;
    accumulate the depersonalized audio data from the plurality of participant media systems to create shared depersonalized audio data comprising audio streams from each of the plurality of participant media systems, the shared depersonalized audio data defining one or more audio components lacking personalized configurations, wherein the shared depersonalized audio data is usable to be processed by a head-related transfer function (HRTF) module to generate a personalized audio output based on HRTF data;

transmit the shared depersonalized audio data to a plurality of spectator media systems to generate a unique personalized audio output for each spectator media system based on unique HRTF data stored at each spectator media system, wherein the spectator media systems do not have control over the position of objects in the interactive rendered environment.

6. The system of claim 5, wherein the depersonalized audio data comprises at least one audio component associated with a participant media platform of the plurality of participant media systems.

7. The system of claim 5, wherein the computer-executable instructions further cause the system to:
transmit the shared depersonalized audio data for rendering a plurality of output audio for a plurality of endpoint devices, wherein the plurality of output audio is based on HRTF data of a plurality of spectators.

8. A computing device, comprising:
a processor;
a memory having computer-executable instructions stored thereupon which, when executed by the processor, cause the computing device to
receive media data from a participant media platform, wherein the media data comprises at least one of 3D audio data, ambisonics data, and channel-based audio data,
generate depersonalized audio data based on the media data, wherein the depersonalized audio data comprises at least one audio component associated with the participant media platform, and wherein the depersonalized audio data is generated based at least in part on a position of objects within an interactive rendered environment controlled in part by a participant media system that is communicatively coupled to the participant media platform; and
communicate the depersonalized audio data to a media sharing platform, wherein the media sharing platform is configured to:
accumulate depersonalized audio data from a plurality of participant media systems;
process the accumulated depersonalized audio data to generate shared depersonalized audio data, and
transmit the shared depersonalized audio data to an endpoint device, the shared depersonalized audio data causing the endpoint device to render output audio based on a head-related transfer function (HRTF) data of a spectator, wherein the output audio comprises personalized audio data, wherein the personalized audio data is configured according to at least one physical feature of the spectator defined in the HRTF data, wherein the endpoint device does not have control over the position of objects in the interactive rendered environment.

9. The computing device of claim 8, wherein the computer-executable instructions further cause the computing device to:
render participant output audio based on the depersonalized audio data and based on HRTF data of a participant.

10. The computing device of claim 8, wherein the received media data comprises one or more audio components having configured audio levels corresponding to each audio component.

11. The computing device of claim 10, wherein the computer-executable instructions further cause the computing device to
increase or decrease the configured audio levels of each audio component based on the HRTF data of the spectator.

12. The computing device of claim 8, wherein the computer-executable instructions further cause the computing device to:
receive additional media data related to a plurality of participants;
generate a plurality of depersonalized audio data based on the additional media data; and
communicate the plurality of depersonalized audio data to the media sharing platform, wherein the media sharing platform is further configured to sum the plurality of depersonalized audio data to generate the shared depersonalized audio data.

13. The computing device of claim 12, wherein the output audio is personalized based on a summation of the plurality of depersonalized audio data.

14. The computing device of claim 8, wherein the computer-executable instructions further cause the computing device to:
transmit the shared depersonalized audio data for rendering a plurality of output audio for a plurality of endpoint devices, wherein the plurality of output audio is based on HRTF data of a plurality of spectators.

15. A system, comprising:
a processor;
a memory having computer-executable instructions stored thereupon which, when executed by the processor, cause the system to
receive a plurality of media data from a plurality of participant media systems,
generate a plurality of depersonalized audio data from the plurality of participant media systems based on the plurality of media data comprising audio streams from each of the plurality of participant media systems, wherein the plurality of depersonalized audio data comprise at least one audio component associated with the plurality of participant media platforms, and wherein the depersonalized audio data is generated based at least in part on a position of objects within an interactive rendered environment controlled in part by the participant media systems; and
communicate the plurality of depersonalized audio data to a media sharing platform, wherein the media sharing platform is configured to:
accumulate the depersonalized audio data;
process the accumulated depersonalized audio data to generate shared depersonalized audio data, and
transmit the shared depersonalized audio data to a remote computing device, the shared depersonalized audio data causing the remote computing device to render an output audio for an endpoint device, wherein the output audio is based on a head-related transfer function (HRTF) data of a spectator, wherein the remote computing device does not have control over the position of objects in the interactive rendered environment.

16. The system of claim 15, wherein the computer-executable instructions further cause the system to:

render a plurality of participant output audio based on the plurality of depersonalized audio data and based on HRTF data of a plurality of participants.

17. The system of claim 15, wherein the received plurality of media data comprises one or more audio components having configured audio levels corresponding to each audio component.

18. The system of claim 17, wherein the computer-executable instructions further cause the system to
increase or decrease the configured audio levels of each audio component based on the HRTF data of the spectator.

19. The system of claim 15, wherein the media sharing platform is further configured to sum the plurality of depersonalized audio data to generate the shared depersonalized audio data.

20. The system of claim 15, wherein the computer-executable instructions further cause the system to:
transmit the shared depersonalized audio data for rendering a plurality of output audio for a plurality of endpoint devices, wherein the plurality of output audio is based on HRTF data of a plurality of spectators.

21. A method, comprising:
receiving media data from a participant media platform, wherein the media data comprises at least one of 3D audio data, ambisonics data, and channel-based audio data,
generating depersonalized audio data based on the media data, wherein the depersonalized audio data comprises at least one audio component associated with the participant media platform, and wherein the depersonalized audio data is generated based at least in part on a position of objects within an interactive rendered environment controlled in part by a participant media system that is communicatively coupled to the participant media platform; and
communicating the depersonalized audio data to a media sharing platform, wherein the media sharing platform is configured to:
accumulate depersonalized audio data from a plurality of participant media systems;
process the accumulated depersonalized audio data to generate shared depersonalized audio data, and
transmit the shared depersonalized audio data to a remote computing device, the shared depersonalized audio data causing the remote computing device to render an output audio for an endpoint device, wherein the output audio is based on a head-related transfer function (HRTF) data of a spectator, wherein the remote computing device does not have control over the position of objects in the interactive rendered environment.

22. The method of claim 21, further comprising:
rendering participant output audio based on the depersonalized audio data and based on HRTF data of a participant.

23. The method of claim 21, wherein the received media data comprises one or more audio components having configured audio levels corresponding to each audio component.

24. The method of claim 23, further comprising:
increasing or decreasing the configured audio levels of each audio component based on the HRTF data of the spectator.

25. The method of claim 21, further comprising:
receiving additional media data related to a plurality of participants;
generating a plurality of depersonalized audio data based on the additional media data; and
communicating the plurality of depersonalized audio data to the media sharing platform, wherein the media sharing platform is further configured to sum the plurality of depersonalized audio data to generate the shared depersonalized audio data.

26. The method of claim 21, further comprising:
rendering participant output audio based on the depersonalized audio data and based on HRTF data of a participant, wherein the participant output audio is stereo audio and wherein the output audio is spatial audio.

27. The system of claim 1, wherein the depersonalized audio data is also communicated to an HRTF module at each the participant media system to generate personalized audio for each participant using HRTF data defining at least one physical characteristic of each participant.

28. The system of claim 1, wherein the HRTF data at each spectator media system defines at least one physical feature of individual spectators associated with each spectator media system, wherein the personalized audio generated at each spectator media system is configured to accommodate the at least one physical feature of individual spectators.

* * * * *